United States Patent [19]
Doi et al.

[11] Patent Number: 5,305,208
[45] Date of Patent: Apr. 19, 1994

[54] DATABASE RETRIEVAL SYSTEM FOR EFFECTIVELY DISPLAYING DIFFERENCES BETWEEN ELEMENTS OF PLURAL DRAWINGS

[75] Inventors: Miwako Doi; Mika Fukui; Akio Okazaki; Hideo Numagami, all of Kanagawa; Yasukazu Okamoto, Chiba; Hiroyuki Tsuboi; Hideki Hirakawa, both of Kanagawa; Yuuichi Kurosawa, Tokyo, all of Japan

[73] Assignee: Kabushiki Kaisha Toshiba, Tokyo, Japan

[21] Appl. No.: 740,901

[22] Filed: Aug. 6, 1991

[30] Foreign Application Priority Data

Sep. 27, 1990 [JP] Japan ............................ 2-255074

[51] Int. Cl.$^5$ .............................................. G09G 1/06
[52] U.S. Cl. .............................. 364/419.19; 395/155; 395/600
[58] Field of Search ............... 364/419, 518, 419.19; 395/100, 118, 144, 147, 153, 155, 425, 600, 919, 921; 382/1, 34

[56] References Cited

U.S. PATENT DOCUMENTS

| | | | |
|---|---|---|---|
| 3,930,237 | 12/1975 | Villers | 340/172.5 |
| 4,665,555 | 5/1987 | Alker et al. | 382/41 |
| 4,843,569 | 6/1989 | Sawada et al. | 385/155 |
| 5,133,052 | 7/1992 | Bier et al. | 395/155 |

OTHER PUBLICATIONS

Tsunekawa et al., "Automatic Drawing Reader-TOSGRAPH", Systems and Computers in Japan, vol. 17, No. 4, 1986.

*Primary Examiner*—Gail O. Hayes
*Attorney, Agent, or Firm*—Finnegan, Henderson, Farabow, Garrett & Dunner

[57] ABSTRACT

A drawing information presentation apparatus has a memory for storing data representing a plurality of drawings, including text labels, and a concept dictionary memory for storing synonyms and connection relation for terms used in the text labels. A correspondence analysis section analyzes correspondence relation of elements of two drawings by referring to data of the concept dictionary memory. Then, a display section displays elements of a first drawing in a manner which demonstrates those elements of the first drawing which correspond to elements of the second drawing, from those elements of the first drawing which do not so correspond, in accordance with the analysis performed by the correspondence analysis section. The apparatus also comprises a drawing description analysis section for extracting drawing titles from document information, and for analyzing the correspondence relationship of the drawing titles between two drawings, by referring to date of the concept dictionary memory. In this case, the correspondence analysis section analyzes the correspondence relationships of elements between two drawings, whose titles are analyzed to correspond to each other by the drawing description analysis section.

20 Claims, 11 Drawing Sheets

FIG.1 CONSTRUCTION OF NEW CPU FOR AI

FIGURE 2   CONSTRUCTION OF RISC

| NODE NUMBER | CHARACTER | START POINT | KIND | FIGURE | START POINT | END POINT |
|---|---|---|---|---|---|---|
| 1 | INSTRUCTION CACHE TAG | (x1, y1) | 10 POINT | null | null | null |
| 2 | INSTRUCTION CACHE CONTROL | (x2, y2) | 10 POINT | RECTANGLE | (X4, Y4) | (X5, Y5) |
| 3 | INSTRUCTION ADDRESS | (x3, y3) | 10 POINT | null | null | null |
| ∫ | ∫ | ∫ | ∫ | ∫ | ∫ | ∫ |

| LINE NUMBER | KIND | START POINT | END POINT | NODE NUMBER | | NODE NUMBER | |
|---|---|---|---|---|---|---|---|
| 1 | ONE ARROW | (x6, y6) | (xm, ym) | 1 | IN | 2 | OUT |
| 2 | BOTH ARROW | (xn, yn) | (x0, y0) | 10 | IN/OUT | 13 | IN/OUT |
| ∫ | ∫ | ∫ | ∫ | ∫ | | ∫ | |

| NODE NO. OUT \ IN | 1 INSTRUC-TION CACHE TAG | 2 INSTRUC-TION CACHE CONTROL | 3 INSTRUC-TION ADDRESS | 4 BRANCH CONTROL | 5 BRANCH UNIT FOR TAG | 6 DATA CACHE TAG | 7 DATA CACHE CONTROL | 8 STACK ACCESS CONTROL | 9 DATA ADDRESS | 10 DATA MEMORY CONTROL | 11 DATA | 12 ALU SHIFTER | 13 PIPE LINE | 14 OPERA-TION UNIT FOR DATA | 15 REG-ISTER FILE |
|---|---|---|---|---|---|---|---|---|---|---|---|---|---|---|---|
| 1 INSTRUCTION CACHE TAG | | 1 | | | | | | | | | | | | | |
| 2 INSTRUCTION CACHE CONTROL | | | 1 | | | | | | | | | | | | |
| 3 INSTRUCTION ADDRESS | | | | 1 | | | | | | | | | | | |
| 4 BRANCH CONTROL | | | 1 | | | | | | | | | | | | |
| 5 BRANCH UNIT FOR TAG | | | | | | | | | | | | | 1 | | |
| 6 DATA CACHE TAG | | | | | | | 1 | | | | | | | | |
| 7 DATA CACHE CONTROL | | | | | | | | 1 | | | | | | | |
| 8 STACK ACCESS CONTROL | | | | | | | | | 1 | | | | | | |
| 9 DATA ADDRESS | | | | | | | | | | 1 | | | | | |
| 10 DATA MEMORY CONTROL | | | | | | | | | | | | | 1 | | |
| 11 DATA | | | | | | | | | | | | | | | |
| 12 ALU SHIFTER | | | | | | | | | | | | | 1 | 1 | |
| 13 PIPE LINE | | | | | | | | | | | | 1 | | 1 | 1 |
| 14 OPERATION UNIT FOR DATA | | | | | | | | | | | | 1 | 1 | | 1 |
| 15 REGISTER FILE | | | | | | | | | | | | 1 | 1 | 1 | |

*FIG. 6*

| NODE NO. OUT \ IN | 1 DATA CACHE TAG | 2 DATA CACHE | 3 DATA ADDRESS | 4 DATA MEMORY CONTROLLER | 5 REGISTER FILE | 6 PIPE LINE | 7 ALU SHIFTER | 8 BRANCH CONTROLLER | 9 HARD WIRED INSTRUCTION | 10 INSTRUCTION REGISTER | 11 INSTRUCTION | 12 INSTRUCTION ADDRESS | 13 INSTRUCTION CACHE | 14 INSTRUCTION CACHE TAG | 15 DATA |
|---|---|---|---|---|---|---|---|---|---|---|---|---|---|---|---|
| 1 DATA CACHE TAG | | 1 | | | | | | | | | | | | | |
| 2 DATA CACHE | | | 1 | | | | | | | | | | | | |
| 3 DATA ADDRESS | | | | 1 | | | | | | | | | | | |
| 4 DATA MEMORY CONTROLLER | | | | | 1 | | | | | | | | | | 1 |
| 5 REGISTER FILE | | | | | | 1 | | | | | | | | | |
| 6 PIPE LINE | | | | | 1 | | 1 | | | | | | | | |
| 7 ALU SHIFTER | | | | 1 | 1 | 1 | | | | | | | | | |
| 8 BRANCH CONTROLLER | | | | | | 1 | | | | | | | | | |
| 9 HARD WIRED INSTRUCTION | | | | | | | | 1 | | | | | | | |
| 10 INSTRUCTION REGISTER | | | | | | | | | 1 | | | | | | |
| 11 INSTRUCTION | | | | | | | | | | 1 | | | | | |
| 12 INSTRUCTION ADDRESS | | | | | | | | | | | 1 | | | | |
| 13 INSTRUCTION CACHE | | | | | | | | | | | | 1 | | | |
| 14 INSTRUCTION CACHE TAG | | | | | | | | | | | | | 1 | | |
| 15 DATA | | | | | | | | | | | | | | | |

FIG. 7

| TERM | SYNONYM | ANTONYM | CONNECTION |
|---|---|---|---|
| ∫ | ∫ | ∫ | ∫ |
| CONTROLLER | CONTROL (95) CONTROL SECTION (95) | null | SUFFIX (OMISSION) |
| ∫ | ∫ | ∫ | ∫ |
| CONTROL | CONTROLLER (95) CONTROL SECTION (95) | null | SUFFIX (OMISSION) |
| ∫ | ∫ | ∫ | ∫ |

FIG. 10

| NODE NUMBER | CORRESPONDENCE NODE |
|---|---|
| 1 | 14 |
| 2 | 13 |
| 3 | 12 |
| 4 | 8 |
| 5 | null |
| 6 | 1 |
| 7 | 2 |
| 8 | null |
| 9 | 3 |
| 10 | 4 |
| 11 | 15 |
| 12 | 7 |
| 13 | 6 |
| 14 | null |
| 15 | 5 |

FIG. 11A

| NODE NUMBER | CORRESPONDENCE NODE |
|---|---|
| 1 | 6 |
| 2 | 7 |
| 3 | 9 |
| 4 | 10 |
| 5 | 15 |
| 6 | 13 |
| 7 | 12 |
| 8 | 4 |
| 9 | null |
| 10 | null |
| 11 | null |
| 12 | 3 |
| 13 | 2 |
| 14 | 1 |
| 15 | 11 |

FIG. 11B

| LINE NUMBER | CORRESPONDENCE LINE |
|---|---|
| 1 | 13 |
| 2 | 8 |
| 3 | 6 |
| 4 | null |
| 5 | 9 |
| ⟨ | ⟨ |

FIG. 13A

| LINE NUMBER | CORRESPONDENCE LINE |
|---|---|
| 1 | 7 |
| 2 | 9 |
| 3 | 13 |
| 4 | 11 |
| 5 | 6 |
| ⟨ | ⟨ |

FIG. 13B

FIG. 1 CONSTRUCTION OF NEW CPU FOR AI

FIGURE 2 CONSTRUCTION OF RISC

DRAWING TITLE PATTERNS

| | DOCU-MENT | FIGURE 1 | FIGURE 2 | FIGURE 3 |
|---|---|---|---|---|
| FIG. 1 | | 10 | 80 | 5 |

FIG. 19

RULE 1 ; SIMILARITY VALUE OF DRAWING TITLE IS OVER 70.

RULE 2 ; SIMILARITY VALUE OF TITLE IN EXPLANATION IS OVER 80.

FIG. 20

DATABASE RETRIEVAL SYSTEM FOR EFFECTIVELY DISPLAYING DIFFERENCES BETWEEN ELEMENTS OF PLURAL DRAWINGS

BACKGROUND OF THE INVENTION

1. Field of the Invention

The present invention relates generally to database retrieval systems for storing drawing information, and more particularly to a drawing information presentation apparatus and method in a database retrieval system for effectively displaying differences between elements of plural drawings.

2. Description of the Background

Recently, a database retrieval system has been constructed to store a large amount of patent information in its database. The patent information consists of the drawings contained in patents, wherein each patent has previously assigned plural keywords which indicate characteristics of the disclosure of the patent. A user of the system desires to retrieve patents which are most similar to an input description or drawing. To use the system, the user inputs a keyword which indicates characteristics of the input data. Then, the database retrieval system retrieves patent information consisting of those patents whose keywords coincide with input keyword, and displays the retrieved patent information.

In general, such database retrieval system is useful to determine whether patents exist or not. For example, when a new product is developed in a company, the development engineer must determine whether the product may be described in a patent which has already issued. If such patent has already issued, the engineer must determine differences between elements of the new product and the patent. For the purpose of this patent search, the database retrieval system is used.

In this case, stored patent information and input data includes plural drawings. Specifically, the patent information includes a block diagram corresponding to a claim. Such block diagram is called a "claim correspondence drawing". In addition, a block diagram of the new product is also previously stored in the database retrieval system. Firstly, the engineer inputs a keyword which indicates characteristics of the new product. The database retrieval system retrieves patent information whose keyword coincides with input keyword and displays the retrieval patent information, including the claim correspondence drawing. Then the engineer makes the database retrieval system display the claim correspondence drawing and the block diagram of the new product, to permit comparison between the drawing and the diagram.

It often happens, however, that technical labels for similar function blocks, and the block arrangement and location are different between these two drawings. For example, FIG. 1 shows a block diagram of new CPU for artificial intelligence (AI) and FIG. 2 shows a block diagram of a CPU for a reduced instruction set computer (RISC). It is assumed that FIG. 1 is block diagram of new product and FIG. 2 is claim correspondence drawing of patent information from a data base. Though both these two diagrams show CPUs, the element arrangement and location is different between these two drawings. Moreover, even if two elements are substantially same (for example, "instruction cache control" in FIG. 1 and "instruction cache" in FIG. 2), the characters providing text description of these technical terms are different. Therefore, when the user views these two drawings on a display to compare them, it takes a long time for the user to discriminate the similarities and differences between these two drawings.

Thus, in the prior art, when user desires to compare drawings stored in database, the prior art database retrieval system only displays these drawings. In short, the database retrieval system cannot effectively present the difference between two drawings on display to user.

SUMMARY OF THE INVENTION

Accordingly, it is an object of the present invention to provide a drawing information presentation apparatus for effectively displaying the difference between two drawings.

These and other object of the present invention are accomplished by providing a drawing information presentation apparatus, which comprises a drawing information memory for storing a plurality of drawing records comprising data representing drawings including drawing elements, the drawing elements including character terms; a concept dictionary memory for storing data representing connection relations between character terms; a correspondence analysis means for calculating correspondence relation values between data representing elements of first and second ones of the drawing records, in accordance with data stored in the concept dictionary memory; and a display means for presenting a display of a drawing represented by the first drawing record, the display discriminating those elements of the first drawing which have a correspondence relation value above a predetermined threshold value for at least one element of the second drawing from elements of the first drawing which do not have a correspondence relation value above the threshold value for at least one element of the second drawing. The apparatus also comprises a drawing description analysis means for extracting drawing titles from the drawing records, for analyzing correspondence relation between the drawing titles of the records in accordance with data stored in the concept dictionary memory, and for selecting first and second ones of the drawing records according to the analyzed correspondence relations.

BRIEF DESCRIPTION OF THE DRAWINGS

FIGS. 6 and 7 show the format of data representing logical information stored in the drawing information memory section of the apparatus of FIG. 3;

FIG. 10 shows a matrix for determining a maximum similarity value in the logical information memory section of the apparatus of FIG. 3;

FIGS. 11A and 11B show an example of a node correspondence table stored in the correspondence memory section of the apparatus of FIG. 3;

FIGS. 13A and 13B show an example of line correspondence table stored in the correspondence memory section of the apparatus of FIG. 3;

FIG. 18 shows drawing title patterns associated with rules of extracting a drawing title;

FIG. 19 shows calculation result of similarity value between drawings as determined by the drawing description analysis section; and FIG. 20 shows rules for deciding similarity values between drawings in the drawing description analysis section of FIG. 16.

DESCRIPTION OF THE PREFERRED EMBODIMENTS

Figures 3, 4, 5:
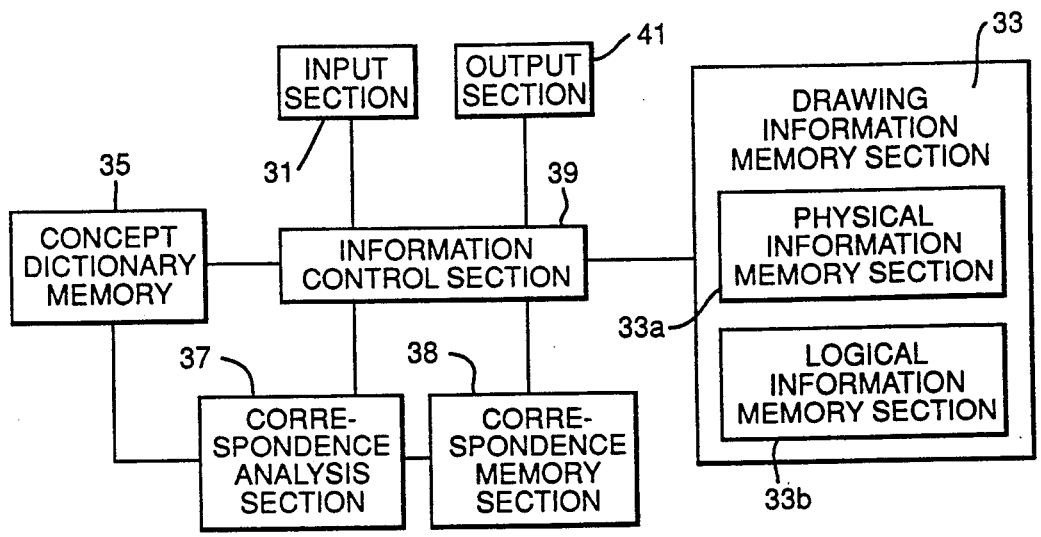
FIG. 3 shows a block diagram of a drawing information presentation apparatus constituting a preferred embodiment of the present invention.
FIGS. 4 and 5 show the format of data representing physical information stored in the drawing information memory section of the apparatus of FIG. 3.

FIG. 3 shows a block diagram of a drawing information presentation apparatus constituting a preferred embodiment of the present invention. An input section 31 may be, for example, a scanner for inputting drawings, and a keyboard for inputting retrieval designations. A drawing information memory section 33 stores data representing patents including patent drawings supplied through the input section 31 Such data is stored in the form of drawing records and includes data representing geometric figures, character terms, and connecting lines. A concept dictionary memory 35 stores previously entered data representing connection relationships, including synonyms, of character terms (block labels) used in drawing records. A correspondence analysis section 37 analyses data representing character terms of elements, or nodes, in two drawing records stored in the drawing information memory section 33 by referring to the concept dictionary memory 35, and examines correspondence relation of data representing elements of two drawings. A correspondence memory section 38 stores correspondence relations of elements between two drawing records examined by the correspondence analysis section 37. An information control section 39 controls an output section 41 to present a drawing display which effectively discriminates those elements of the drawing which correspond to a compared drawing from those elements which do not correspond, according to corresponding relation of elements stored in the correspondence memory section 38.

For example, the output section 41 displays elements which do not correspond by thick lines and elements which do correspond by normal lines on the drawing. In the preferred embodiment, the apparatus shown in FIG. 3 is implemented in a high-speed general purpose mainframe computer, such as a Toshiba computer model AS4330.

The operation of the apparatus shown in FIG. 3 will now be described. It is assumed that two drawing records, one representing a block diagram of new type CPU for artificial intelligence shown in FIG. 1 and one representing a block diagram of old type CPU shown in FIG. 2, are supplied through the input section 31. Typically, the drawing record of FIG. 2 will have been previously stored, along with drawing records representing many other existing circuits. The drawing information memory section 33 comprises a physical information memory section 33a and logical information memory section 33b. The physical information memory section 33a stores node information (node number, kind of figure, figure start point coordinate, figure end point coordinate, character data, kind of character, character start point) for each node in the drawing record. Physical information memory section 33a also stores line information (line number between nodes, start point coordinate of line, end point coordinate of line, pairs of numbers of nodes connected by the line).

Figure 1:
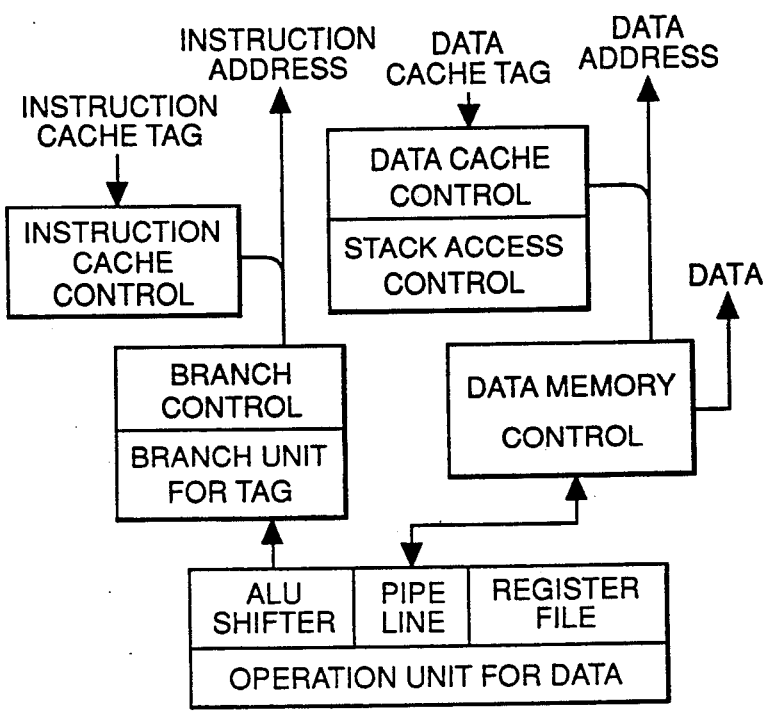
FIGS. 1 and 2 show examples of drawing information to be compared.
Figure 2:
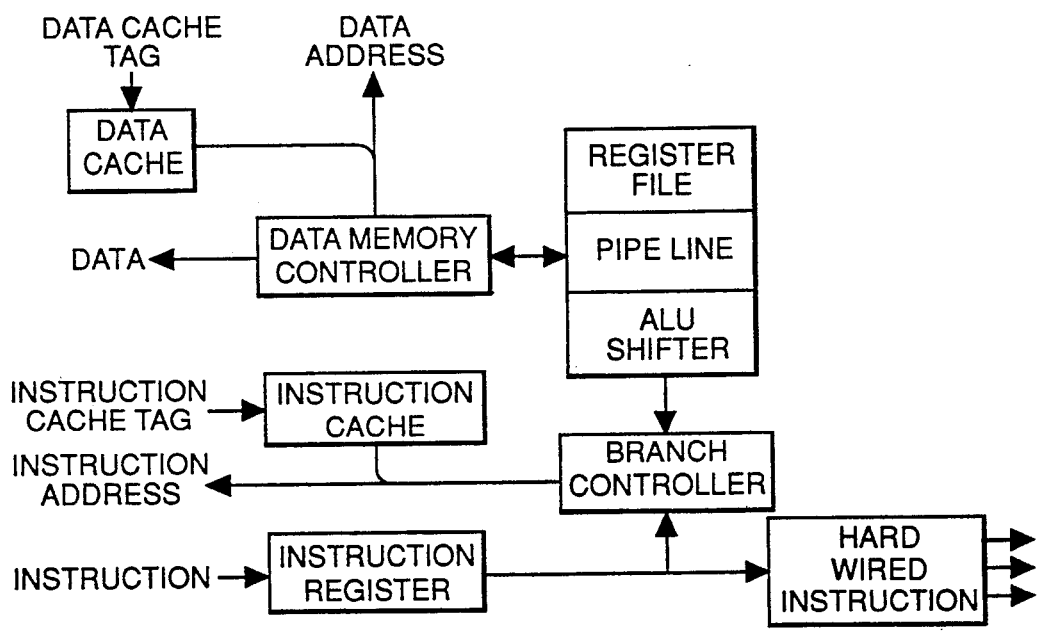

FIGS. 4 and 5 respectively show the format of node information and line information stored in the physical information memory section 33a for the drawing record representing the drawing shown in FIG. 1.

For example, when a drawing consisting of a dot matrix image is supplied through the input section 31, the information control section 39 extracts nodes and lines (elements) from the drawing image numbers, separates nodes and lines respectively in order, and separates dot images corresponding to geometric figures from dot images corresponding to characters, or text, for each node. Then, the information control section 39 recognizes the kind of figure and the kind of characters by pattern matching. Next, the information control section 39 extracts start point coordinates of characters, and start and end point coordinates of figures, start and end point coordinates of lines between pairs of nodes, by way of line tracing. The node information is stored in the physical information memory section 33a shown in FIG. 4. The line information is stored in the physical information memory section 33a shown in FIG. 5. Such pattern matching and line tracing techniques ar well-known to those skilled in the art and are explained in detail, for example, in Electron-Communication-Society Thesis, '85/4 Vol. J-68-D No. 4, pp. 466-472 "DRAWING READER TOSGRAPH (author; SYO TSUNEKAWA, SHIGEYOSHI SHIMOTSUJI)."

For example, in FIG. 4, node information of node 1 of FIG. 1 is as follows. The character, or text label, for node 1 is "instruction cache tag". Its start point coordinate is (X1, Y1). The size of the character is ten-point. The node 1 "instruction cache tag" constitutes characters only without a surrounding rectangle, as shown in FIG. 1. Therefore, the kind of figure, start point coordinate of the figure, and end point coordinate of the figure are each "null."

In FIG. 1, the line connecting "instruction cache tag" and "instruction cache control" is designated as line 1. In FIG. 5, line information of line 1 of FIG. 1 is as follows. The kind of line 1 is a single-point arrow, designated as "one arrow." Its start point coordinate is (X6, Y6). Its end point coordinate is (Xm, Ym). In FIG. 1, line 1 is drawn from node 1 to node 2 because node 1 represents input to line 1 and node 2 represents output to line 1. Therefore, the single arrow of line 1 is pointed to node 2 as shown in FIG. 1.

As for the connection relation shown in FIG. 6, the logical information memory section 33b stores a matrix (calculated by the information control section 39) in which all nodes are arranged in rows and columns, and nodes labelling a row represent input to a line (IN) and nodes labelling a column represent output (OUT) from a line. For each pair of nodes connected by a line, a flag "1" is set in an appropriate square of the matrix corresponding to the "IN" and "OUT" nodes.

FIG. 6 thus represents the logical information of the record corresponding to the drawing shown in FIG. 1, and FIG. 7 represents the logical information of the record corresponding to the drawing shown in FIG. 2. For example, in FIG. 6, line 1 (single-pointed arrow) which is drawn from node 1 to node 2 is shown by flag "1" in the square corresponding to "IN" node 1 and "OUT" node 2. Line 2 (double-pointed arrow) which is drawn between node 10 ("data memory control") and node 13 ("pipeline") is shown by two flags; first, flag "1" in square corresponding to "IN" node 10 and "OUT" node 13, and second by flag "1" in square corresponding to "OUT" node 10 and "IN" node 13.

Figures 8, 9:
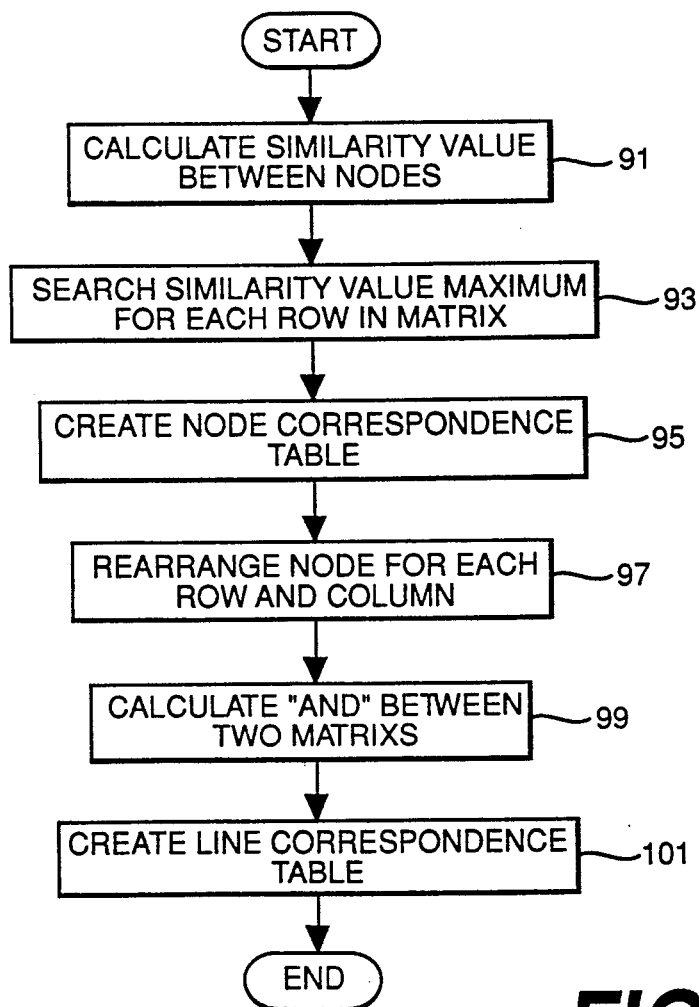
FIG. 8 shows the format of data stored in the concept dictionary memory of the apparatus of FIG. 3.
FIG. 9 shows a logic flow chart of a method executed in the correspondence analysis section of the apparatus of FIG. 3.

The correspondence analysis section 37 analyzes the correspondence relation of elements (nodes) between the logical information of two drawing records stored in logical information memory section 33b by referring to concept dictionary memory 35. FIG. 8 shows the format of the concept dictionary. The concept dictionary memory comprises a memory which has been pre-stored with synonym, antonym, and connection relations corresponding to terms used in drawings.

FIG. 9 shows a logic flow chart of a method of the correspondence analysis section 37. Firstly, the corresponding analysis section 37 creates a new matrix (FIG. 10) in which nodes of the record of FIG. 1 are arranged in rows, and nodes of the record of FIG. 2 are arranged in columns. In short, the section 37 arranges nodes shown in FIG. 6 (row and column) in rows of the new matrix and nodes shown in FIG. 7 (row and column) in columns of the new matrix of FIG. 10, as shown by the new matrix created by the section 37.

Figure 10:
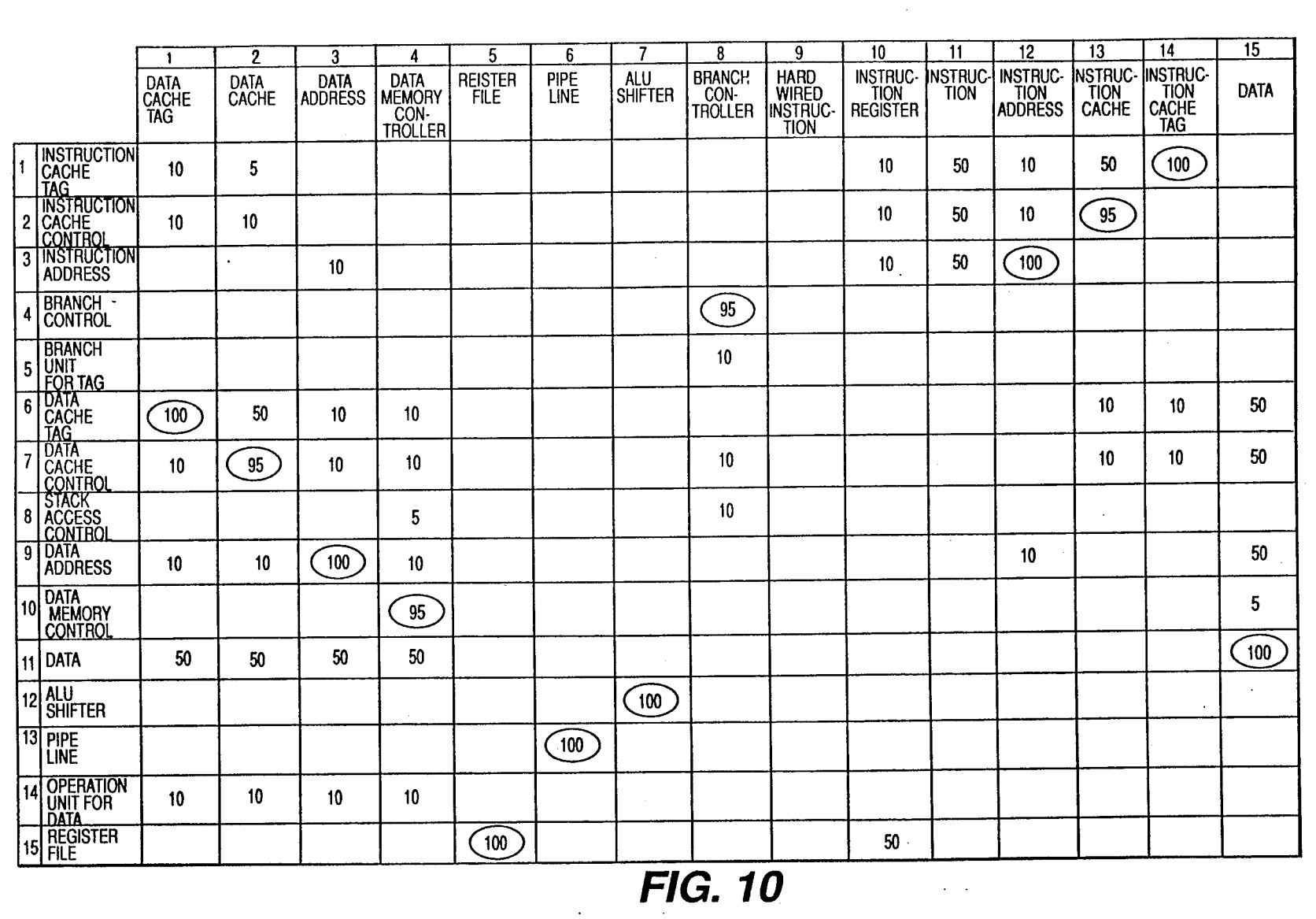

At the beginning, the matrix of FIG. 10 is empty, and contains no values in its squares. The section 37 calculates similarity values between row nodes and column nodes respectively. (Step 91 in FIG. 9) As for calculating similarity values, the following rules for assigning similarity values are used:

| 1 | perfect matching | [100] |
|---|---|---|
| 2 | perfect matching by connection | [95] |
| 3 | perfect matching by synonym | [dictionary value] |
| 4 | inclusion matching | [50] |
| 5 | position coincident partial matching | [10] |
| 6 | position incoincident partial matching | [5] |

The dictionary value is defined for synonyms respectively in the concept dictionary 35 as shown in FIG. 8.

As an example of the operations of section 37, calculation processing for row 1 "instruction cache tag" of the matrix shown in FIG. 10 is explained.

As for column 1 "data cache tag" in FIG. 10, the following coincidence is detected.

| [instruction], | [cache], | [tag] |
|---|---|---|
|  | \| | \| |
| [data], | [cache], | [tag] |

The position of terms [cache] and [tag] are the same for both nodes. Therefore, above-mentioned rule 5 is adopted. In short, a similarity value of "10" is written in the square corresponding to row 1 and column 1.

As for column 2 "data cache" in FIG. 10, following coincidence is detected.

| [instruction], | [cache], | [tag] |
|---|---|---|
|  | \| |  |
| [data], | [cache] |  |

The position of the term [cache] is the same in both nodes, but there is no term corresponding to [tag]. Therefore, above-mentioned rule 6 is adopted. In short similarity value "5" is written in the square corresponding to row 1 and column 2.

From column 3 "data address" to column 9 "hard wired instruction" in FIG. 10, row 1 "instruction cache tag" does not coincide at all. Therefore, no similarity value is written in squares corresponding to row 1 and columns 3 to 9.

As for column 10 "instruction register" and column 12 "instruction" in FIG. 10, the position of term "instruction" of row 1 is same. Therefore, above-mentioned rule 5 is adopted and similarity value "10" is written in square corresponding to row 1 and column 10, row 1 and column 12.

As for column 11 "instruction," the following coincidence is detected.

| [instruction], | [cache], | [tag] |
|---|---|---|
| \| |  |  |
| [instruction] |  |  |

The term "instruction" of column 11 is included in row 1 "instruction cache tag." Therefore, above-mentioned rule 4 is adopted, and similarity value "50" is written in square corresponding to row 1 and column 11.

As for column 13 "instruction cache," this term is completely included in the row 1 node, and rule 4 is adopted. Therefore, similarity value "50" is written in the square corresponding to row 1 and column 13.

As for column 14 "instruction cache tag" in FIG. 10, complete correspondence is noted:

| [instruction], | [cache], | [tag] |
|---|---|---|
| \| | \| | \| |
| [instruction], | [cache], | [tag] |

These terms are matching perfectly. Therefore, above-mentioned rule 1 is adopted and similarity value "100" is written in square corresponding to row 1 and column 14.

As for row 2 "instruction cache control" and column 13 "instruction cache" in FIG. 10, the process of calculating the similarity value is explained. The "connection" column of the concept dictionary shown in FIG. 8 indicates that the term "control" may be omitted when the term "control" is used as suffix. Accordingly, following coincidence is detected with respect to row 2 and column 13 of FIG. 10:

| [instruction], | [cache], | [control] |
|---|---|---|
| \| | \| | \| |
| [instruction], | [cache] | (omission) |

Therefore, above-mentioned rule 2 is adopted and similarity value "95" is written in the square corresponding to row 2 and column 13.

As for row 10 "data memory control" and column 4 "data memory controller" in FIG. 10, the process of calculating the similarity value is explained. The "synonym" column of the concept dictionary shown in FIG. 8 indicates that term the "controller" is a synonym of the term "control," and the similarity value is "95" in such a case. Accordingly, following coincidence is detected for row 10 and column 4:

| [data], | [memory], | [control] |
|---|---|---|
| | | | | | [95] |
| [data], | [memory], | [controller] |

Therefore, above-mentioned rule 3 is adopted, and similarity value "95" is written in the square corresponding to row 10 and column 4. In these ways, similarity values between nodes in one drawing and nodes in another drawing are calculated, as shown in FIG. 10.

Next, the correspondence analysis section 37 determines the column number whose similarity value is maximum for each row number according to similarity values of the matrix shown in FIG. 10 (Step 93 in FIG. 9). For example, as for row 1 of FIG. 10, similarity value "100" of column 14 is maximum. As for row 2, similarity value "95" of column 13 is maximum. If the similarity value, which is selected in these ways, exceeds a predetermined threshold value (for example, "50"), the row number (node) and column number (node) corresponding to the similarity value are decided to correspond each other. Then, the section 37 creates a node correspondence table (Step 95 in FIG. 9).

FIG. 11A shows a node correspondence table created for nodes of drawing shown in FIG. 1 compared to FIG. 2. FIG. 11B shows a node correspondence table created for nodes of the drawing shown in FIG. 2, compared to FIG. 1. In this case, as for row 8 of the matrix shown in FIG. 10, there is no similarity value which exceeds "50". In short, there is not column node corresponding to row 8. Therefore, in node correspondence table shown in FIG. 11A, correspondence node number of the node number "8" is "null."

Figure 12:
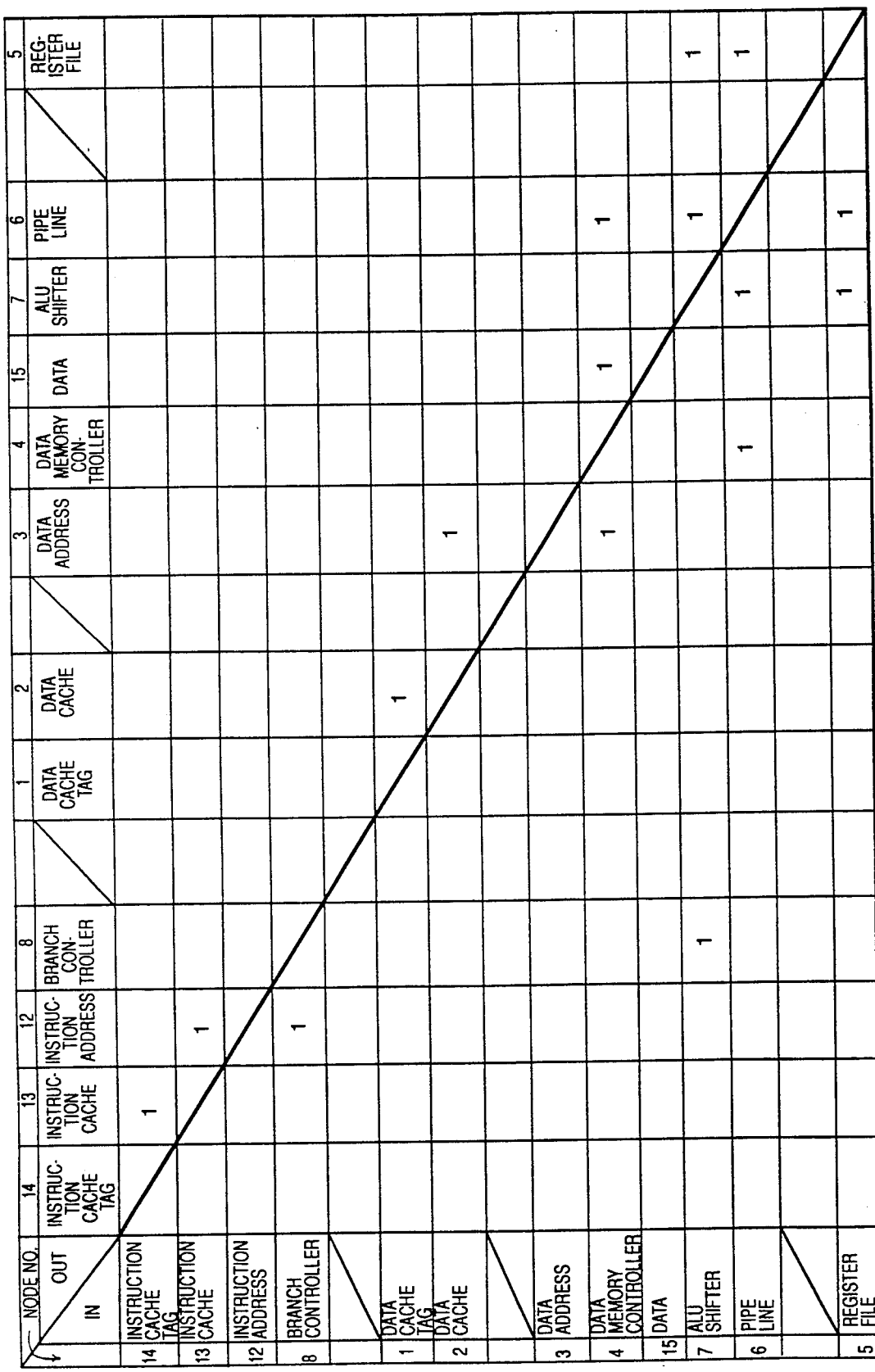
FIG. 12 shows a matrix for rearranging elements of the drawing information stored in the logical information memory section of the apparatus of FIG. 3.

Next, the correspondence analysis section 37 decides correspondence relation between lines of the drawing shown in FIG. 1 and lines of the drawing shown in FIG. 2. In this case, according to the node correspondence table shown in FIG. 11A, row nodes and column nodes of the matrix shown in FIG. 7 are rearranged to respectively correspond to row nodes and column nodes of the matrix shown in FIG. 6. (Step 97 in FIG. 9). In this place, the square value "1" of matrix shown in FIG. 7 is also written in squares of the new matrix according to rearrangement of rows and columns of the matrix. FIG. 12 shows the new matrix in which row nodes and column nodes of the matrix shown in FIG. 7 were rearranged respectively. Then, the section 37 performs an "AND" calculation between the matrix shown in FIG. 6 and the matrix shown in FIG. 12. In the matrix which results from the "AND" calculation, only squares corresponding to the same position squares, in which "1" is already set in both FIGS. 6 and 12, are written with "1." (Step 99 in FIG. 9).

The section 37 also creates a line correspondence table consisting of a matrix generated by a similar "AND" calculation of the line matrices. (Step 101 in FIG. 9). FIG. 13A shows such a line correspondence table created on the basis of lines of the drawing shown in FIG. 1. FIG. 13B shows a line correspondence table created on the basis of lines of the drawing shown in FIG. 2. For example, as for line 1 between node 1 "instruction cache tag" and node 2 "instruction cache control" of the drawing in FIG. 1, line 13 between node 14 "instruction cache tag" and node 13 "instruction cache" of drawing in FIG. 2 is decided to correspond.

In these ways, the node correspondence table and the line correspondence table are stored in the correspondence memory section 38.

Next, the information control section 39 causes the output section 41 to display the drawing information stored in the drawing information memory section 33 according to the node correspondence table and the line correspondence table stored in the correspondence memory section 38. For example, as for the drawing information shown in FIG. 1, nodes 5, 8, and 14 in FIG. 1 do not correspond to any node in FIG. 2 according to the node correspondence table shown in FIG. 11A, and are thus designated as non-correspondence element. Also, line 4 in FIG. 1 does not correspond to line in FIG. 2 according to any the line correspondence table shown in FIG. 13A. Therefore, the information control section 39 makes the output section 41 to create a display in which these elements (nodes and lines) which do not correspond are discriminated from elements which do correspond, which are designated as correspondence element.

Figure 14:
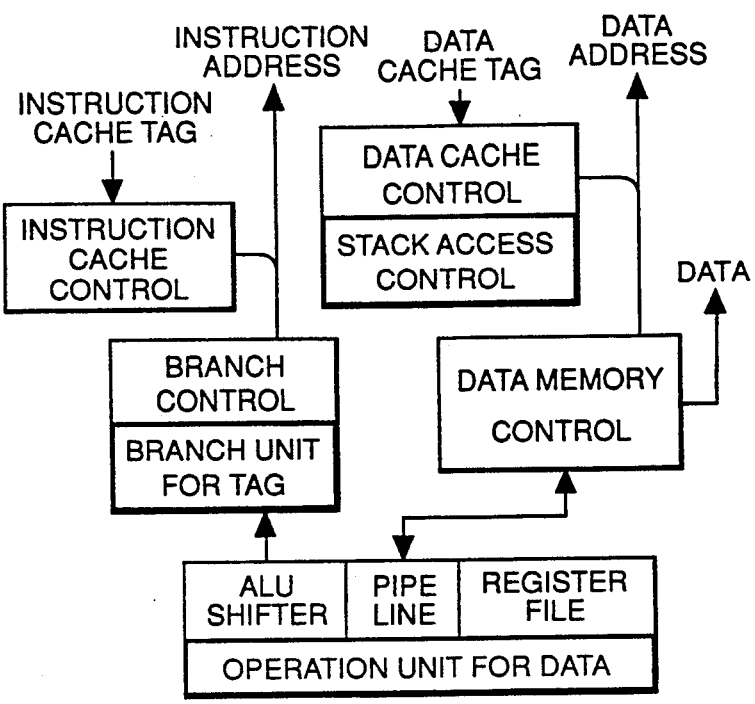
FIGS. 14 and 15 show an output result of the drawing information presentation apparatus of FIG. 3.

FIG. 14 shows such a display created by output section 41 for FIG. 1. In short, the output section 41 displays non-correspondence elements by thick lines to discriminate these from correspondence elements of FIG. 1. Of course, non-correspondence elements may be displayed by other attributes, for example, oblique lines, turning over (inversion), or a different color.

Figure 15:
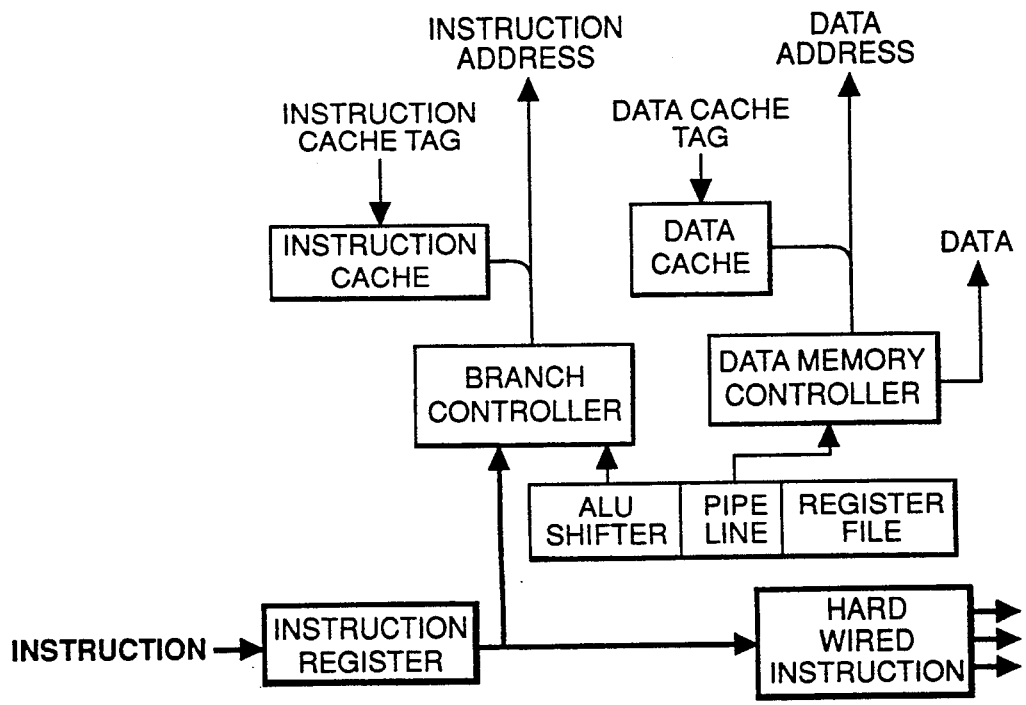

In this case, it is possible for the information control section 39 to rearrange the position of elements in FIG. 2 to the position of correspondence elements in FIG. 1 according to the node correspondence table shown in FIG. 11B and the physical information shown in FIG. 4, and display the rearranged drawing of FIG. 2. FIG. 15 shows the elements of FIG. 2 displayed by this method. As shown in FIG. 15, it is easy for a user to compare elements of the drawing record of FIG. 1 with elements of drawing record of FIG. 2.

In general, patent information includes plural drawings. The plural drawings may include, for example, block diagrams, flow charts, circuit diagrams, display scenes, and so on. If a user (engineer) has a block diagram of a new product, this block diagram must be compared with only the block diagram of the patent information stored in the data base, and not, for example, be compared with flow charts. Accordingly, in advance of the comparing process according to the above-mentioned embodiment of the present invention, the block diagram to compare with the user's block diagram must be selected from the plural drawings in the patent information of the stored data base.

Figure 16:
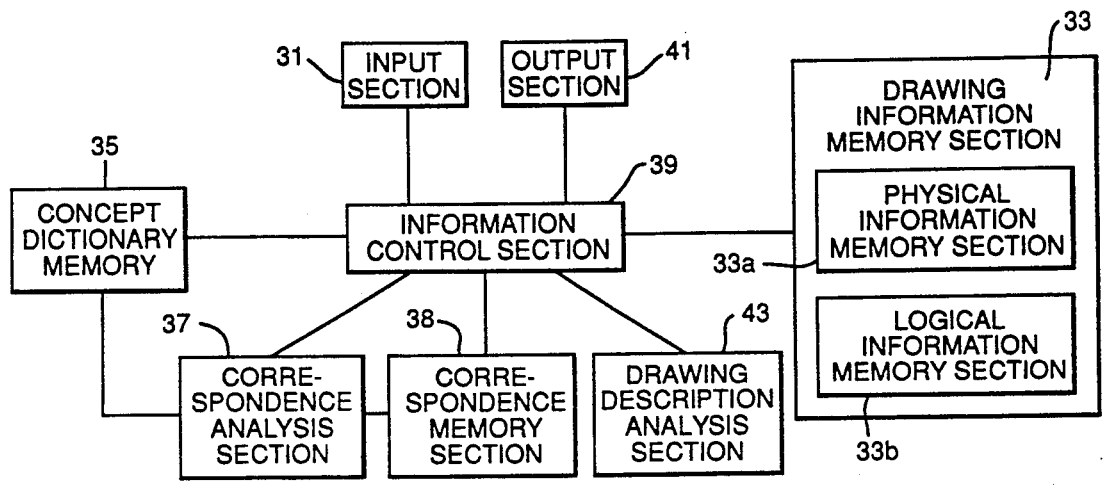
FIG. 16 shows a block diagram of a drawing information presentation apparatus constituting another preferred embodiment of the present invention.
Figure 17:
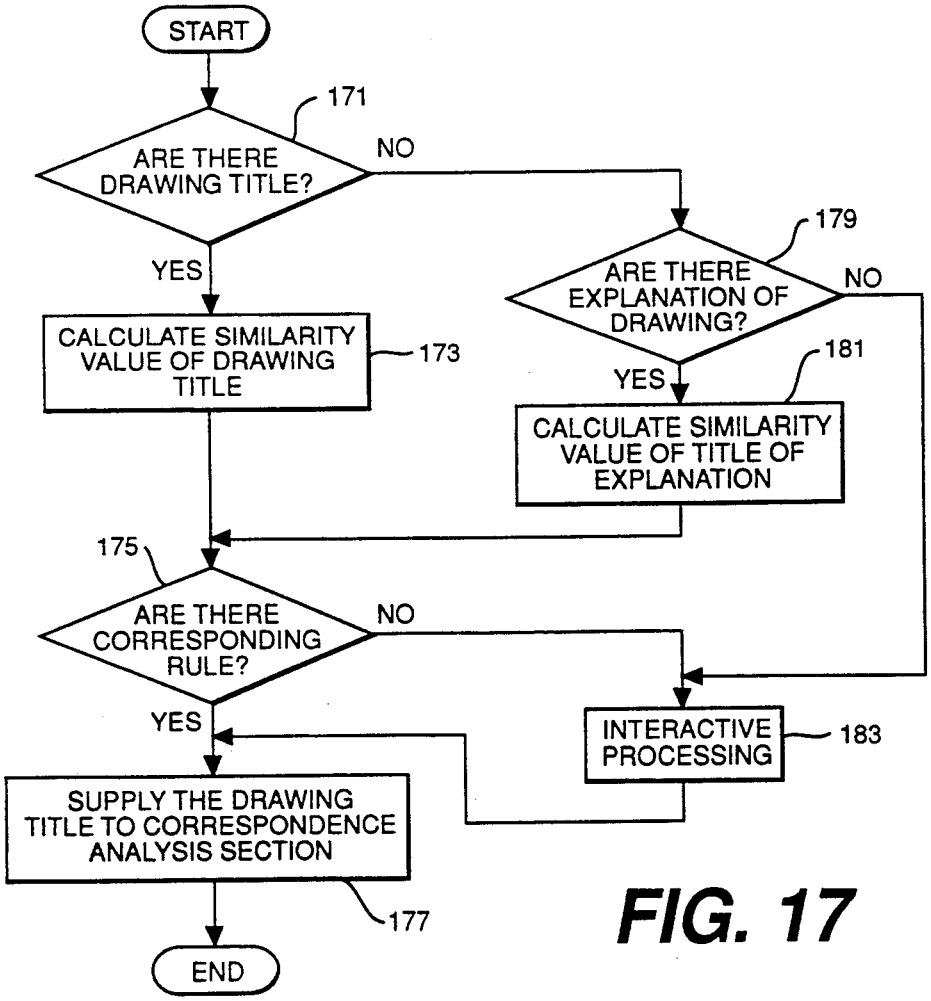
FIG. 17 shows a logic flow chart of the method of the drawing description analysis section of the apparatus of FIG. 16.

FIG. 16 shows a block diagram of a drawing information presentation apparatus constituting another preferred embodiment of the present invention. In addition to the apparatus shown in FIG. 3, the apparatus of FIG. 16 also includes a drawing description analysis section 43. FIG. 17 shows a logic flow chart of a method executed by the drawing information analysis section 43.

When document information including plural drawings is supplied through the input section 31, the drawing information analysis section 43 checks whether a drawing title is included in the document information or not (Step 171 in FIG. 17). FIG. 18 shows patterns of extracting drawing titles. In general, a drawing title is often added to upper side or lower side of drawings. Therefore, the drawing description analysis section 43 extracts a drawing title according to the patterns. In this place, [n] in FIG. 18 is as follows:

| 1. number; | 1, 2, 3, — |
|---|---|
| 2. alphabet (small); | a, b, c, — |
| 3. alphabet (big); | A, B, C, — |

Also, a following mark may be added to above number or alphabet.

| 6. parenthesis; | ( ) |
|---|---|
| 7. bracket; | [ ] |
| 8. hyphen; | - |
| 9. period; | . |

For example, in the drawing of FIG. 1, the drawing title [FIG. 1 CONSTRUCTION OF NEW CPU FOR AI] is extracted because the rule [FIG. n] is included in this. In the drawing of FIG. 2, the drawing title [FIG. 2 CONSTRUCTION OF RISC] is extracted because the rule [Figure n] is included in this. In these ways, when the drawing titles are extracted from plural drawings, the drawing description analysis section 43 calculates a similarity value between the drawing title of the document and the drawing title of user's block diagram respectively by referring to the concept dictionary memory 35 (Step 173 in FIG. 17).

For example, it is assumed that document (#1) stored in the data base includes three drawings, of which one of them is the drawing in FIG. 2. The drawing in FIG. 1 is a user's block diagram of a new product. The section 43 calculates similarity values for the titles of individual drawings in the same way in which the correspondence analysis section 37 calculates similarity values of elements between two drawings. In this case, similarity values are calculated as shown in FIG. 19.

Next, the section 43 checks whether the drawing title of the user's block diagram (FIG. 1) corresponds to one of the drawings of the data base document or not, according to rules for similarity value (Step 175 in FIG. 17). FIG. 20 shows rules for similarity value between drawing titles. In this case, the drawing title (FIG. 1) is decided to correspond to the drawing title (FIG. 2) according to rule 1 in FIG. 20. Therefore, the section 43 supplies the drawing title name (FIG. 2) whose elements must be supplied for analysis by the correspondence analysis section 37 (Step 177 in FIG. 17).

As mentioned above, document information often includes drawing numbers and drawing titles which are written together, as shown in FIG. 1 and FIG. 2. However, drawings in patent information of the data base includes only a drawing number, for example [FIG. 1]. (The patent information of the data base comprises patent data records each representing a patent, each patent date including a text data record associated with a group of drawing records.) In this case, the section 43 searches for an explanation of drawing in the text data record (Step 179 in FIG. 17), and extracts a drawing title from such explanation. Then, the section 43 calculates similarity values between the drawing title extracted and the user's drawing title (Step 181 in FIG. 17). For example, patent text data records usually include "BRIEF DESCRIPTION OF THE DRAWINGS" as an explanation of drawings. Therefore, the section 43 can extract drawing titles from the text data record according to the rules shown in FIG. 18.

However, if the section 43 cannot extract an explanation of a drawing from the text data record or cannot find the rule for deciding similarity value shown in FIG. 20, the section 43 inquires of the user about the drawing to be selected through the output section 41 (Step 183 in FIG. 17). Then, the section 43 supplies the drawing name selected by the user to the correspondence analysis section 37.

It will be apparent to those skilled in the art that various modifications and variations can be made without departing from the spirit or scope of the present invention. The present invention covers such modifications and variations which are within the scope of the appended claims and their equivalents.

What is claimed is:

1. A drawing information presentation apparatus, comprising:

a drawing information memory means for storing a plurality of drawing records comprising data representing drawings including drawing elements, the drawing elements including character terms;

a concept dictionary memory for storing data representing connection relations between character terms;

a correspondence analysis means for calculating correspondence relation values between data representing elements of first and second ones of the drawing records, in accordance with data stored in the concept dictionary memory; and a display means for presenting a display of a drawing represented by the first drawing record, the display discriminating those elements of the first drawing which have a correspondence relation value above a predetermined threshold value for at least one element of the second drawing from elements of the first drawing which do not have a correspondence relation value above the threshold value for at least one element of the second drawing.

2. The drawing information presentation apparatus according to claim 1, wherein the concept dictionary memory stores data representing synonym relations between character terms.

3. The drawing information presentation apparatus according to claim 1, wherein the elements comprise nodes including character terms and geometric figures, and the elements further comprise lines connecting pairs of nodes in the drawing.

4. The drawing information presentation apparatus according to claim 3, wherein the drawing information memory means includes physical information memory means for storing data representing node charateristics.

5. The drawing information presentation apparatus according to claim 4, wherein the drawing information memory means includes physical information memory means for storing data representing node charateristics including character data, character start point coordinates, type of character, type of figure, figure start point coordinates and figure end point coordinates; and line information including arrow number, line start point coordinates, line end point coordinates, and number pairs representing nodes connected by the line.

6. The drawing information presentation apparatus according to claim 4 wherein the drawing information memory means includes logical information memory means for storing connection data specifying nodes connected by a line.

7. The drawing information presentation apparatus according to claim 6, wherein the correspondence analysis means includes means for calculating similarity values between nodes of the first and second drawing records, in accordance with relations between character terms of the nodes represented by data stored in the concept dictionary memory.

8. The drawing information presentation apparatus according to claim 6, wherein the logical information memory means stores a matrix for each drawing record in which all nodes of each drawing record are arranged in rows and columns, and a flag is set in a square of intersection between a row and a column corresponding to two nodes connected by a line;

and wherein the correspondence analysis means includes means for creating a matrix in which nodes of the first drawing record are arranged in row and nodes of the second drawing record are arranged in column by referring the matrix in the logical information memory means, and means for calculating similarity values between each node of a row and each node of a column in accordance with data stored in the concept dictionary memory.

9. The drawing information presentation apparatus according to claim 8, wherein the correspondence analysis means includes means for selecting a maximum of the similarity values corresponding to each row, and means for creating a node correspondence table for storing node numbers of the first drawing and corresponding node numbers of the second drawing in accordance with row and column nodes corresponding to the selected maximum values.

10. The drawing information presentation apparatus according to claim 9, wherein the correspondence analysis means includes means for rearranging data representing nodes of the second drawing in accordance with the order of respective nodes of the first drawing having a correspondence value above the threshold value.

11. The drawing information presentation apparatus according to claim 10, wherein the correspondence analysis means comprises:

a means for creating rearrangement matrix in which nodes of the second drawing are rearranged in rows and columns according to the order of the nodes of the first drawing having correspondence values above the threshold value; and means for performing an "AND" calculation between the rearrangment matrix and the matrix in which all nodes of the first drawing were arranged in rows and columns.

12. The drawing information presentation apparatus according to claim 11, wherein the correspondence analysis means includes means for creating a line correspondence table for storing line numbers of the first drawing and corresponding line numbers of the second drawing in accordance with the result Of the "AND" calculation.

13. The drawing information presentation apparatus according to claim 12, wherein the correspondence analysis means includes means for designating elements of the first drawing as correspondence elements and non-correspondence elements according to data stored in the node correspondence table and the line correspondence table; and wherein the display means comprises means for displaying the data representing elements of the first drawing, in which correspondence elements of the first drawing are displayed with attributes different from non-correspondence elements of the first drawing.

14. The drawing information presentation apparatus according to claim 13, wherein:

the correspondence analysis means includes means for designating elements of the second drawing as correspondence elements and non-correspondence elements according to data stored in the node correspondence table and the line correspondence table; and wherein the display means comprises means for displaying data representing the second drawing correspondence elements in positions according to the physical information of the first drawing and with attributes different from that of non-correspondence elements.

15. A drawing information presentation apparatus, comprising:

a drawing information memory means for storing a plurality of drawing records including data representing drawing elements, the drawing elements including character terms;

a concept dictionary memory for storing data representing connection relations between character terms;

a drawing description analysis means for extracting drawing titles from the drawing records, for analyzing correspondence relations between drawing titles of the records in accordance with data stored in the concept dictionary memory, and for selecting first and second ones of the drawing records according to the analyzed correspondence relations;

a correspondence analysis means for calculating correspondence relation values between data representing elements of the first and second drawings, in accordance with data stored in the concept dictionary memory; and a display means for presenting a display of a drawing represented by the first drawing record, the display discriminating those elements of the first drawing which have a correspondence relation value above a predetermined threshold value for at least one element of the second drawing from elements of the first drawing which do not have a correspondence value above the threshold value for at least one element of the second drawing.

16. The drawing information presentation apparatus according to claim 15, wherein the drawing description analysis means includes means for calculating similarity values between drawing titles of records in accordance with data stored in the concept dictionary memory, and means for selecting the first and second drawing records according to the similarity value.

17. The drawing information presentation apparatus according to claim 16, wherein the drawing description analysis means includes means for supplying the drawing titles which correspond to each other to the correspondence analysis means.

18. The drawing information presentation apparatus according to claim 15, wherein the drawing information memory means comprises means for storing text data records each associated with a group of the drawing records, and wherein the drawing description analysis means includes means for extracting drawing title information from the text data records, and means for extracting the drawing title from the drawing title information.

19. The drawing information presentation apparatus according to claim 16, wherein the drawing description analysis means includes means for requesting input from a user when all similarity values are smaller than predetermined value.

20. A method for presenting drawing information, comprising the steps of:

storing a plurality of drawing records comprising data representing drawings including drawing elements, the drawing elements including character terms;

storing data representing connection relations between character terms in a concept dictionary memory;

calculating correspondence relation values between data representing elements of first and second ones of the drawing records, in accordance with data stored in the concept dictionary memory; and presenting a display of a drawing represented by the first drawing record, the display discriminating those elements of the first drawing which have a correspondence relation value above a predetermined threshold value for at least one element of the second drawing from elements of the first drawing which do not have a correspondence relation value above the threshold value for at least one element of the second drawing.

* * * * *

UNITED STATES PATENT AND TRADEMARK OFFICE
CERTIFICATE OF CORRECTION

PATENT NO. : 5,305,208
DATED : April 19, 1994
INVENTOR(S) : Miwako Doi et al.

It is certified that error appears in the above-indentified patent and that said Letters Patent is hereby corrected as shown below:

Claim 4, column 10, line 55, change "charateristics" to --characteristics--.

Claim 5, column 10, line 59, change "charateristics" to --characteristics--.

Claim 11, column 11, line 44, delete "a".

Claim 12, column 11, line 58, change "Of" to --of--.

Signed and Sealed this

Tenth Day of January, 1995

Attest:

BRUCE LEHMAN

Attesting Officer

Commissioner of Patents and Trademarks